US008255773B2

(12) United States Patent
D'Abreu et al.

(10) Patent No.: US 8,255,773 B2
(45) Date of Patent: Aug. 28, 2012

(54) SYSTEM AND METHOD OF TRACKING ERROR DATA WITHIN A STORAGE DEVICE

(75) Inventors: Manuel Antonio D'Abreu, El Dorado Hills, CA (US); Stephen Skala, Fremont, CA (US)

(73) Assignee: Sandisk Technologies Inc., Plano, TX (US)

( * ) Notice: Subject to any disclaimer, the term of this patent is extended or adjusted under 35 U.S.C. 154(b) by 618 days.

(21) Appl. No.: 12/494,186

(22) Filed: Jun. 29, 2009

(65) Prior Publication Data

US 2010/0332949 A1    Dec. 30, 2010

(51) Int. Cl.
*G11C 29/00*    (2006.01)

(52) U.S. Cl. ........................................ 714/764

(58) Field of Classification Search ............... 714/753, 714/755, 758, 763–766, 819
See application file for complete search history.

(56) References Cited

U.S. PATENT DOCUMENTS

| | | | | |
|---|---|---|---|---|
| 4,077,028 A | * | 2/1978 | Lui et al. | 714/777 |
| 4,646,312 A | * | 2/1987 | Goldsbury et al. | 714/763 |
| 5,463,642 A | * | 10/1995 | Gibbs et al. | 714/765 |
| 5,754,753 A | * | 5/1998 | Smelser | 714/6.13 |
| 6,397,365 B1 | * | 5/2002 | Brewer et al. | 714/766 |
| 7,099,194 B2 | | 8/2006 | Tu et al. | |
| 7,844,886 B1 | * | 11/2010 | Ngo | 714/785 |
| 2003/0217323 A1 | | 11/2003 | Guterman et al. | |
| 2004/0257888 A1 | | 12/2004 | Noguchi et al. | |
| 2005/0055621 A1 | | 3/2005 | Adelmann et al. | |
| 2006/0062048 A1 | | 3/2006 | Gonzalez et al. | |
| 2007/0255889 A1 | | 11/2007 | Yogev et al. | |

FOREIGN PATENT DOCUMENTS

| | | |
|---|---|---|
| WO | 9936913 A1 | 7/1999 |
| WO | 2007134133 A2 | 11/2007 |

OTHER PUBLICATIONS

Invitation to Pay Additional Fees and, Where Applicable, Protest Fee and Partial International Search from the International Searching Authority (EPO) for corresponding PCT Application No. PCT/US2010/039699 mailed Aug. 5, 2010, 7 pages.
International Search Report and Written Opinion of the International Searching Authority for International Application No. PCT/US2010/039699, mailed Oct. 1, 2010, 29 pages.

* cited by examiner

*Primary Examiner* — Shelly A Chase
(74) *Attorney, Agent, or Firm* — Toler Law Group, PC (57) ABSTRACT

Systems and methods of tracking error data are disclosed. A method includes receiving a first checksum associated with error locations of a first error correction code operation and receiving a second checksum associated with error locations of a second error correction code operation. The first checksum is compared to the second checksum and an action is initiated on a region of a memory array based on a result of the comparison.

37 Claims, 8 Drawing Sheets

SYSTEM AND METHOD OF TRACKING ERROR DATA WITHIN A STORAGE DEVICE

FIELD OF THE DISCLOSURE

The present disclosure pertains to computer memory systems, and more specifically, to error detection and error location tracking for a data storage device.

BACKGROUND

Error detection and correction processes help maintain data integrity within memory storage devices and communication channels. For example, error correcting codes (ECC) are commonly used for fault detection in computer memory subsystems. An ECC includes redundant data to identify one or more errors to the stored data in a memory. For example, "soft" errors are typically caused by electrical transmission disturbances, while "hard" errors may be due to the memory device.

With increasingly shrinking storage device circuitry and lower operating voltages, there is a need for increased accuracy and efficiency in error identification and correction processes.

SUMMARY

An improved system and method of identifying and correcting errors is disclosed. A number of error correction code operations may be executed that each identify a set of error locations for a region of a memory. The set of error locations may be compared to previous error locations and an appropriate action may be initiated. The set of error locations may be encoded in a manner to preserve error location information, such as via a checksum. A checksum associated with the set of error locations may be determined for each error correction code operation. Two or more checksums may be compared to identify a trend. An action to address the errors may be initiated based on a result of the checksum comparison or by evaluating a detected trend.

For example, checksums that are the same over time may indicate hard failures of bits that are not degrading. If an error is determined to move locations over time, the error is likely attributable to transmission disturbances and not hardware defects. Such errors may be managed so long as a total ECC count does not change. A wordline defect, such as a cracked wordline, may be identified if errors are located at an end of a wordline.

DETAILED DESCRIPTION

Figure 1:
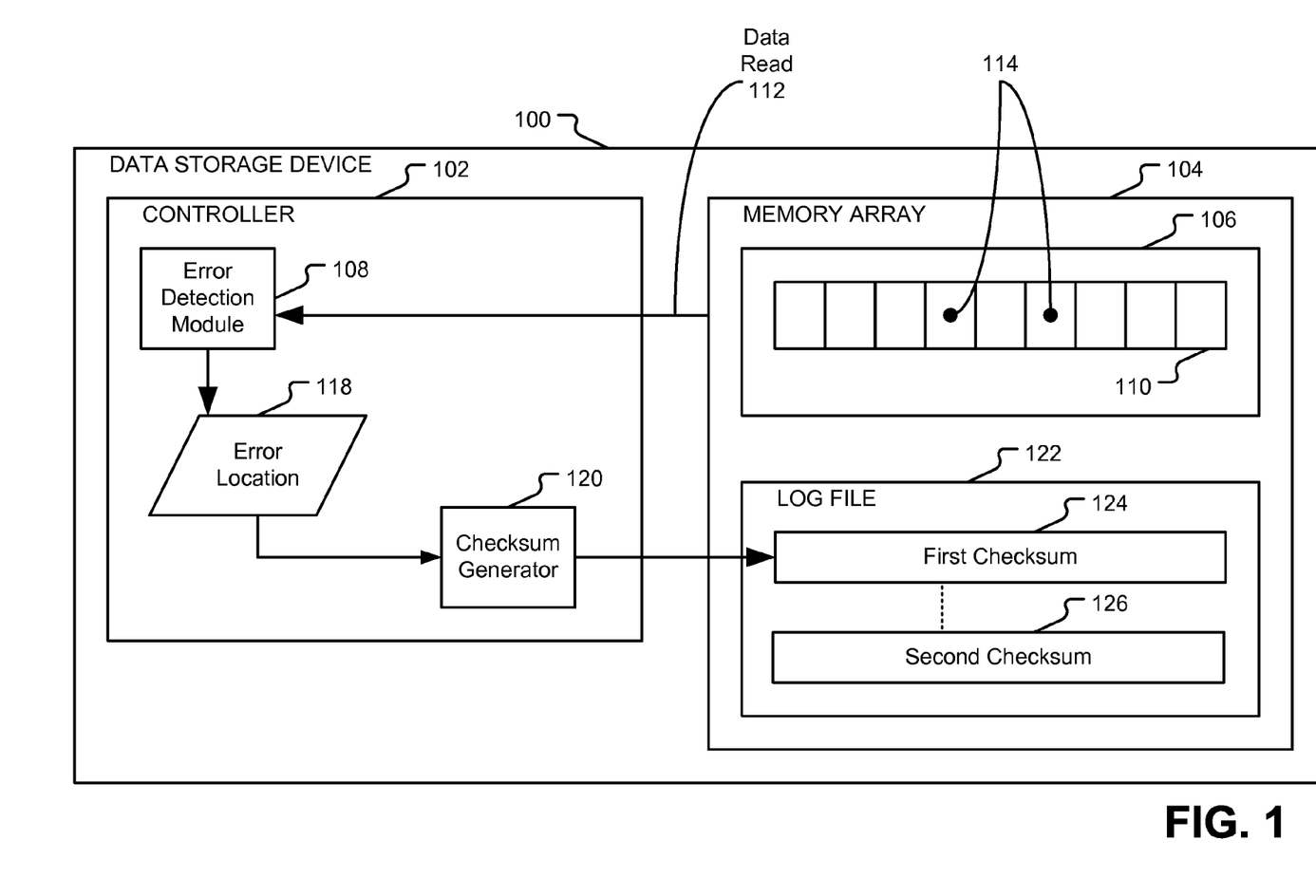
FIG. 1 is a block diagram of a data storage device that may be used to track error data.

Referring to FIG. 1, an illustrative embodiment of a data storage device that may be used to track error data is depicted and generally designated 100. The data storage device 100 includes a controller 102 coupled to a memory array 104. The controller 102 is configured to track and compare error location data corresponding to data read from the memory array 104 and may initiate actions based on the comparisons.

The memory array 104 may include non-volatile memory, such as flash memory. The memory array 104 includes a representative memory region 106 that includes stored data 110. The memory region 106 may be a wordline, a memory block, or a memory page. A word line may include a line in a row direction within the memory array 104. A memory block may include a smallest unit of erasable memory. A memory page may include a smallest unit of writable memory. The data 110 includes detectable errors 114 associated with respective locations 118 within the stored data 110.

The controller 102 may be configured to access the memory array 104 to read the data 110 via a logical communication link that returns data 112 read from the memory array 104. An error detection module 108 of the controller 102 may be configured to detect a number of the errors 114 and to detect error locations 118 in response to reading the data 110. For example, the error detection module 108 may include an error correct code (ECC) engine.

The controller 102 may additionally include a checksum generator 120. The checksum generator 120 may generate a checksum based on the error location data 118. For example, the checksum generator 120 may output a first checksum 124 and a second checksum 126 of error location data 118 generated by the error detection module 108 during first and second error correction code (ECC) operations, respectively. The first checksum 124 and the second checksum 126 may each be based on a plurality of locations associated with each of a plurality of errors for a respective error correction code operation. The checksum generator 120 may alternatively include a Multiple Input Signature Register (MISR). Incorporation of an MISR may reduce hardware requirements. Another example of a checksum generator 120 may include a polynomial based circuit. Polynomial based circuits may include Linear Feedback Shift Registers (LFSR) or combinational logic. Another example of a checksum generator is a circuit with an adder and an accumulator that function as an accumulating adder. The checksum generator 120 may be part of an ECC engine.

The first checksum 124 and the second checksum 126 may be stored within a log file 122 of the memory array 104. For example, the controller 102 may store generated checksums over time for each region of the memory array 104. The controller 102 may logically associate each of the first checksum 124 and the second checksum 126 with a different time stamp. For example, the time stamps may correspond to the error correction code operation during which checksums were generated.

During operation, the controller 102 may retrieve the first checksum 124 and the second checksum 126 from a log file 122 of the memory array 104. The controller 102 may further compare the first checksum 124 to the second checksum 126 and may initiate an action associated with the memory region 106 at least partially based on the comparison of the first checksum 124 to the second checksum 126. Examples of actions may include moving data, initiating a read scrub, refreshing data, designating a block of data as bad data, monitoring data, and correcting an error of the plurality of errors, as will be described with respect to FIGS. 3-10.

FIG. 1 thus illustrates a data storage device 100 for generating checksums that are each based on a plurality of locations associated with each of a plurality of errors for a respective error correction code operation. The first checksum 124 and the second checksum 126 are compared to efficiently track and correct error data. Although the error detection module 108 and the checksum generator 120 are illustrated as separate elements, the error detection module 108 and checksum generator 120 may be located at the same element (e.g., an ECC). Further, although the first checksum 124 and the second checksum 126 are described as being retrieved from the log file 122, in other embodiments one or more of the first checksum 124 and the second checksum 126 may not be retrieved from the log file 122, as will be described with respect to FIG. 2.

Figure 2:
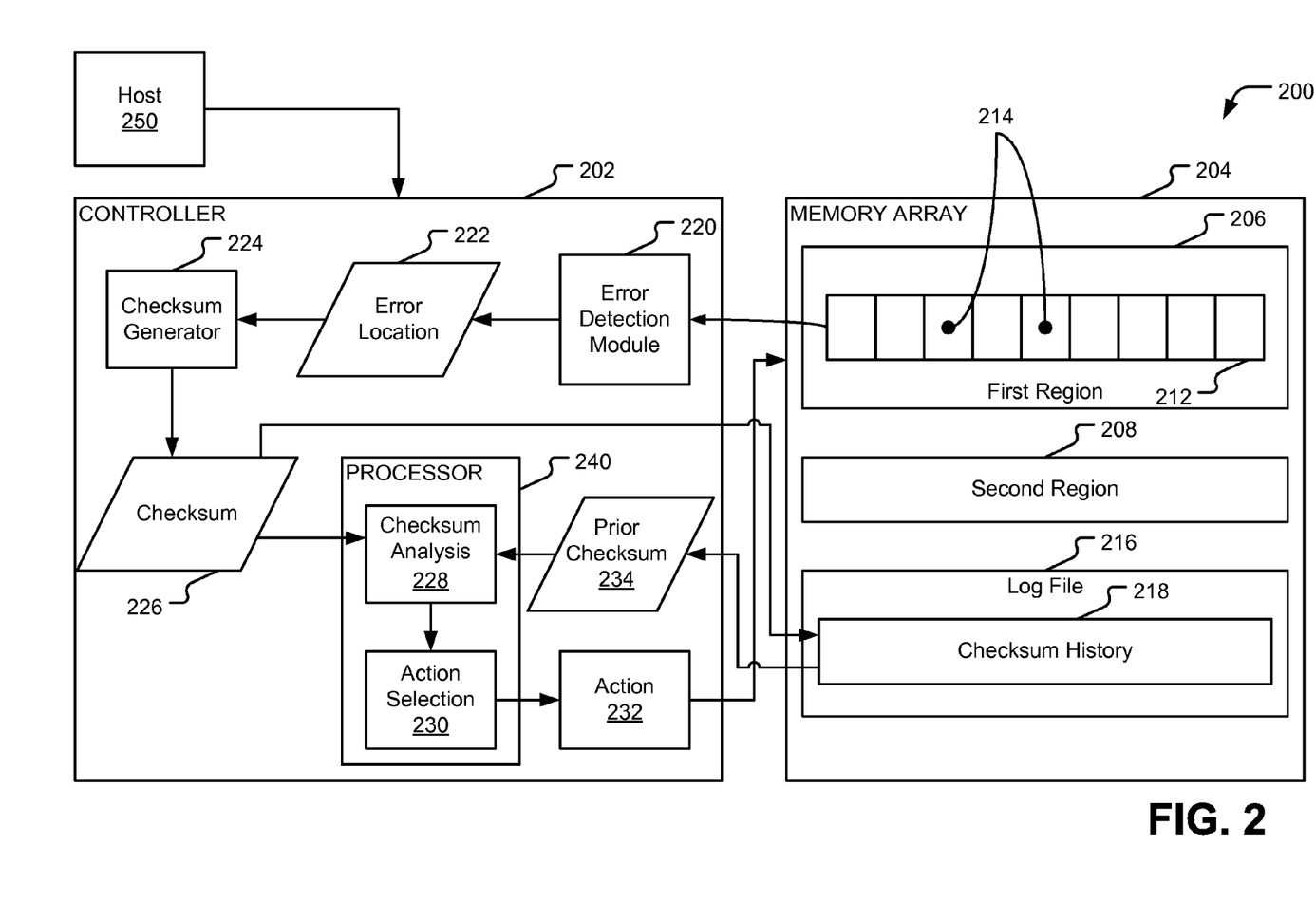
FIG. 2 is a block diagram of a system that may be used to track error data associated with a data storage device.

Referring to FIG. 2, an illustrative embodiment of a system that may be used to track error data associated with a storage device is depicted and generally designated 200. The system 200 may include a controller 202 coupled to a memory array 204. The controller 202 is also coupled to a host computing device 250. The controller 202 and the memory array 204 may be components of a removable data storage device. The controller 202 is configured to track a condition of the memory array 204 by comparing error location information resulting from a data read operation as compared to error location information saved from a prior read operation. For example, a log file 216 of the memory array 204 may include a checksum history 218.

The memory array 204 includes a first memory region 206 and a second memory region 208. The first memory region 206 may represent a page or block of the memory array 204.

The controller 202 includes an error detection module 220. The error detection module 220 may be configured to detect a number of errors 214 and error locations 222 in response to data 212 read from the memory array 204. The error detection module 220 may include an ECC engine.

The controller 202 also includes a checksum generator 224 configured to receive the error locations 222 and to generate a checksum 226. The checksum generator 224 may include an MISR or another polynomial based circuit. For example, a polynomial based circuit may be implemented using LFSR or combinational logic. During multiple error correction code operations, the checksum generator 224 may generate multiple checksums corresponding to a particular region of the memory array 204. The checksum output may be stored in the checksum history 218 of the log file 216 and later retrieved as one or more prior checksums. Each checksum, (e.g., the checksum 226 and the prior checksum 234) may be based on a plurality of locations associated with each of a plurality of errors for a respective error correction code operation.

The controller 202 also includes a processor 240 coupled to the error detection module 220. The processor 240 may initiate storage of the checksum 226 to the log file 216 within the memory array 204 and may initiate the retrieval of the prior checksum 234 from the log file 216 within the memory array 204.

The processor 240 includes a checksum analysis module 228 that is configured to compare the checksum 226 to the prior checksum 234. The processor 240 also includes an action selection module 230. The action selection module 230 is configured to automatically initiate a plurality of available actions 232 based on the comparison of the checksum 226 to the prior checksum 234. Examples of actions include moving data, initiating a read scrub, refreshing data, designating a block of data as bad data, monitoring data, and correcting one or more errors. As an example, the checksum analysis module 228 may be executed by the processor 240 to retrieve and compare the checksum 226 and the prior checksum 234. The checksum analysis module 228 may also be configured to identify a result based on the comparison. For example, the checksum analysis module 228 may identify from the comparison that errors are uncorrelated, random and attributable to disturbance. In another example, the checksum analysis module 228 may identify that the errors are at similar locations and are likely hard errors. The action selection module 230 may be executed by the processor 240 to receive the result from the checksum analysis module 228 and to selectively initiate an action.

FIG. 2 thus illustrates a system 200 for tracking and selectively taking actions regarding errors associated with a storage device. The system 200 enables efficient and accurate error tracking and correction.

Figure 3:
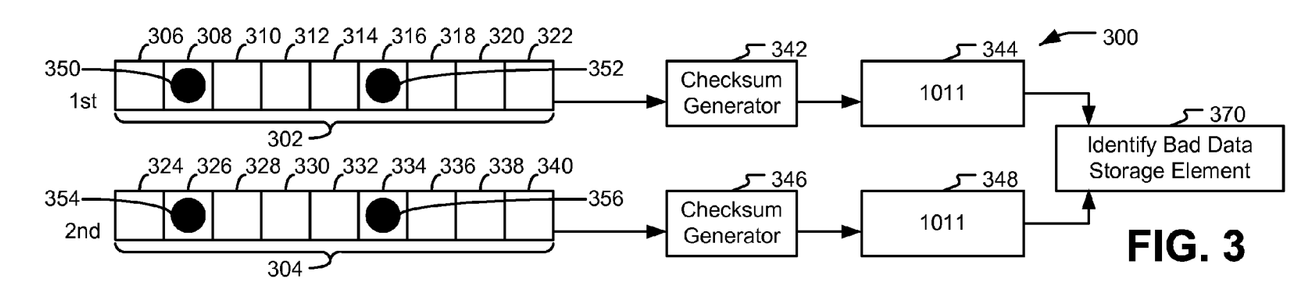
FIG. 3 illustrates results of a first set of error correction code operations.

FIG. 3 illustrates an example of results of first and second error correction code operations indicating a bad storage element. The error correction code operations may be performed at different times on a wordline or another data read from memory, such as the data 110 of FIG. 1. Data 302 is an example of error location data that may be evaluated during a first error correction code operation. For example, the data 302 may be the error location information 118 generated by the error detection module 108 of FIG. 1 or the error location information 222 generated by the error detection module 220 of FIG. 2. The data 302 includes memory element locations 306, 308, 310, 312, 314, 316, 318, 320, and 322 corresponding to storage elements in the memory. As an example, error 350 is associated with location 308, and error 352 is associated with location 316.

The data 302 may be received by a checksum generator 342, such as the checksum generator 120 of FIG. 1. The checksum generator 342 may generate a checksum 344, such as the first checksum 124 of FIG. 1, based on the locations 308, 316 associated with the errors 350, 352. As illustrated, the checksum 344 equals binary "1011," which equals decimal "11".

Data 304 may be evaluated during a second error correction code operation. The data 304 includes bit locations 324, 326, 328, 330, 332, 334, 336, 338, and 340. An error 354 is associated with location 326, and an error 356 is associated with location 334.

The data 304 may be received by a checksum generator 346, such as the checksum generator 120 of FIG. 1. The checksum generator 346 may generate a checksum 348, such as the first checksum 124 of FIG. 1, based on the locations 326, 334 associated with the errors 354, 356. As illustrated, the checksum 348 equals binary "1011," which equals decimal "11".

At 370, the checksums 344, 348 may be compared to identify a bad storage element because the errors in the data 302 and the data 304 are in the same locations. Bad storage elements may be indicated by the checksum 342 equaling the checksum 346. For example, the errors 350, 352, 354, 356 may be determined to be hard errors based upon the errors 350, 352, 354, 356 having the same relative locations 308, 316, 326, 334 within the data 302, 304 of the first and second error correction code operations.

FIG. 3 thus illustrates first and second error correction code operations used to determine errors 350, 352, 354, 356 and associated locations 308, 316, 326, 334. Checksums 344, 348 calculated based on the error locations 308, 316, 326, 334 may be compared to determine that the locations of the errors 308, 316, 326, 334 are the same in both error correction code operations. The same relative locations 308, 316, 326, 334 of the errors 350, 352, 354, 356 may indicate the presence of hard errors.

Figure 4:
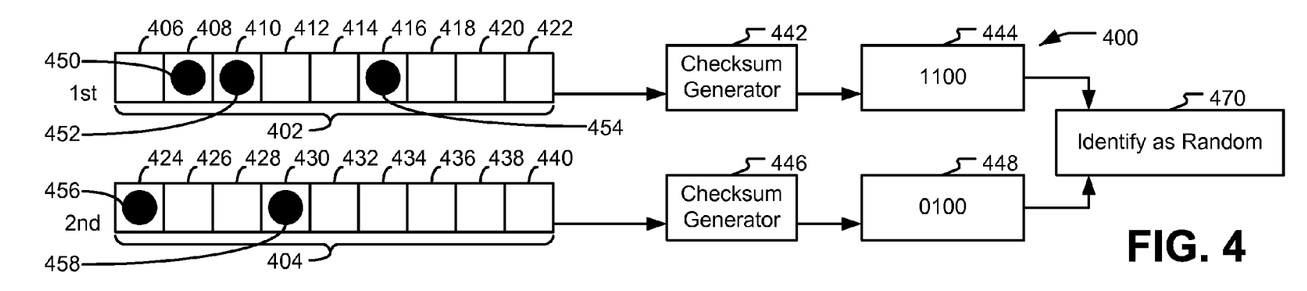
FIG. 4 illustrates results of a second set of error correction code operations.

FIG. 4 illustrates an example of results of first and second error correction code operations indicating random errors. The error correction code operations may be performed at different times on a data element, such as the data 110 of FIG. 1. Data 402 may be evaluated during a first error correction code operation. For example, the data 402 may be the error location information 118 generated by the error detection module 108 of FIG. 1 or the error location information 222 generated by the error detection module 220 of FIG. 2. The data 402 includes bit locations 406, 408, 410, 412, 414, 416, 418, 420, and 422 corresponding to storage elements in the memory. An error 450 is associated with location 408, an error 452 is associated with location 410, and an error 454 is associated with location 416.

The data 402 may be received by a checksum generator 442, such as the checksum generator 120 of FIG. 1. The checksum generator 442 may generate a checksum 444, such as the first checksum 124 of FIG. 1, based on the locations 408, 410, and 416 associated with the errors 450, 452, and 454. As illustrated, the checksum 444 has a binary value of "1100," which corresponds to a decimal value of "12".

Data 404 may be evaluated during a second error correction code operation. The data 404 includes bit locations 424, 426, 428, 430, 432, 434, 436, 438, and 440. An error 456 is associated with location 424, and an error 458 is associated with location 430.

The data 404 may be received by a checksum generator 446, such as the checksum generator 120 of FIG. 1. The checksum generator 446 may generate a checksum 448, such as the first checksum 124 of FIG. 1, based on the locations 424, 430 associated with the errors 456, 458. As illustrated, the checksum 448 has a binary value of "0100," which corresponds to a decimal value of "4".

At 470, the checksums 444, 448 may be compared to identify the errors as random. The discrepancy between the decimal value, "12" of the checksum 444 and the decimal value, "4" of the checksum 448 may indicate uncorrelated, random errors. The errors 450, 452, 454, 456 may be determined to be random errors based upon the errors 450, 452, 454, 456 having different relative locations 408, 416, 426, 434 within the data 402, 404 of both the first and second error correction code operations. Also, a difference between checksum 444 and checksum 448 may be compared to a threshold to identify that the error locations are different.

FIG. 4 thus illustrates first and second error correction code operations used to determine errors 450, 452, 454, 456 and associated locations 408, 416, 426, 434. Checksums 444, 448 calculated based on the error locations 408, 416, 426, 434 may be compared to determine that the locations of the errors 408, 416, 426, 434 are different in both error correction code operations.

Figure 5:
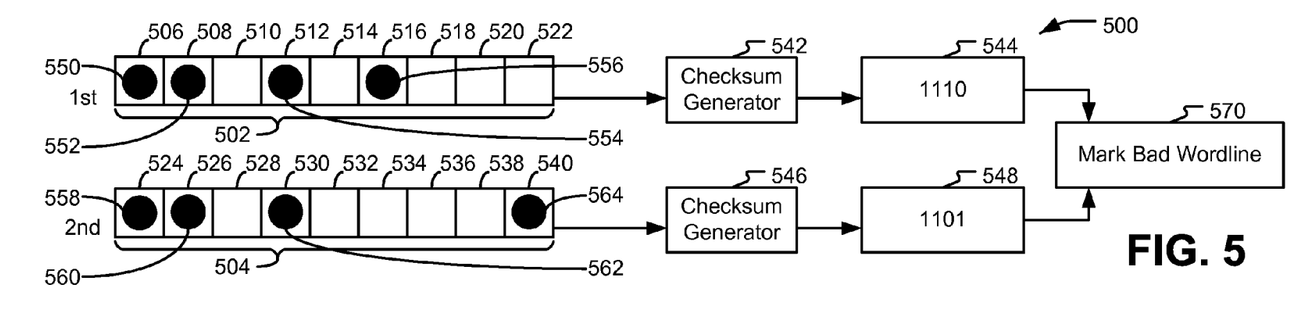
FIG. 5 illustrates results of a third set of error correction code operations.

FIG. 5 illustrates an example of results of first and second error correction code operations. The first and second error correction operations indicate that locations of errors 550, 552, 554 near an end portion of data 502 are similarly distributed to errors 558, 560, 530, which are located near an end portion of data 504. The error correction code operations may be performed at different times on a wordline or other data read from memory, such as the data 110 of FIG. 1. Data 502 may be evaluated during a first error correction code operation. For example, the data 502 may be the error location information 118 generated by the error detection module 108 of FIG. 1 or the error location information 222 generated by the error detection module 220 of FIG. 2. The data 502 includes memory element locations 506, 508, 510, 512, 514, 516, 518, 520, and 522 corresponding to storage elements in the memory. An error 550 is associated with location 506, and an error 552 is associated with location 508. A third error 554 is at location 512 and a fourth error 556 is at location 516.

The data 502 may be received by a checksum generator 542, such as the checksum generator 120 of FIG. 1. The checksum generator 542 may generate a checksum 544, such as the first checksum 124 of FIG. 1, based on the locations 506, 508, 512, and 516 associated with the errors 550, 552, 554, and 556. As illustrated, the checksum 544 includes a binary value of "1110," which corresponds to a decimal value of "14".

Data 504 may be evaluated during a second error correction code operation. The data 504 includes bit locations 524, 526, 528, 530, 532, 534, 536, 538, and 540. An error 558 is associated with a location 524, and an error 560 is associated with a location 526. An error 562 is associated with a location 530, and an error 564 is associated with a location 540.

The data 504 may be received by a checksum generator 546, such as the checksum generator 120 of FIG. 1. The checksum generator 546 may generate a checksum 548, such as the first checksum 124 of FIG. 1, based on the locations 524, 526, 530, and 540 associated with the errors 558, 560, 562, and 564. As illustrated, the checksum 548 includes a binary value of "1101", which corresponds to a decimal value of "13".

At 570, the checksums 544, 548 may be compared to identify a bad wordline. Both checksums 544, 548 include relatively large values. Most errors are present on the same end of the wordline. The errors 550, 552, 554 of the data 502 may be determined to be associated with a bad wordline based upon the similarly located errors 558, 560, 562 of the data 504, as evaluated during both the first and second error correction code operations.

FIG. 5 thus illustrates first and second error correction code operations used to determine errors 550, 552, 554, 556, 558, 560, 562 and 564 and associated locations 506, 508, 512, 516, 524, 526, 530, and 540. The checksums 544, 548 are calculated based on the error locations 506, 508, 512, 516, 524, 526, 530, and 540 and may be compared to determine that the locations of the errors 550, 552, 554, 558, 560, and 562 are concentrated in similar portions of the data 502, 504 in both error correction code operations. The same relative locations 506, 508, 512, 524, 526, and 530 of the errors 550, 552, 554, 558, 560, and 562 may indicate the presence of hard errors resulting from a bad wordline.

One of skill in the art will recognize that FIGS. 3-5 are simplified for ease of explanation. FIGS. 3-5 do not necessarily show accurate values or data word sizes, among other parameters. Embodiments are consequently not limited to these illustrative examples.

Figure 6:
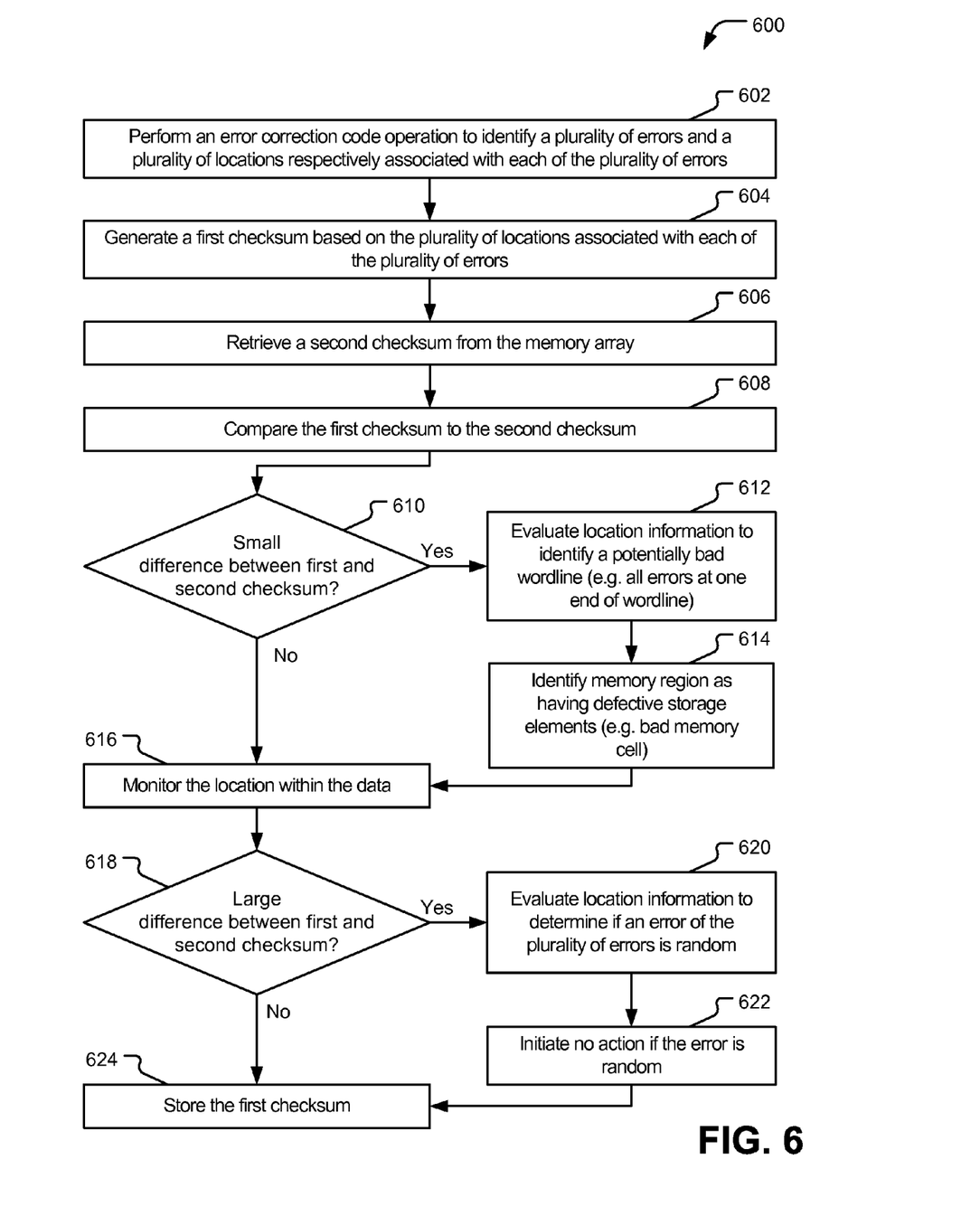
FIG. 6 illustrates a flow chart of a method of tracking error data.

FIG. 6 illustrates a flow chart of a method 600 of tracking error data. The method 600 of FIG. 6 may be performed by a computing system that accesses a memory, such as the controller 102 of FIG. 1 or the controller 202 of FIG. 2. An error correction code operation may be performed to identify a plurality of errors and a plurality of locations respectively associated with each of the plurality of errors, at 602. For example, the controller 102 of FIG. 1 may retrieve data 110 from the memory array 104. The data 110 may be provided to the error detection module 108. Control signals may be generated to cause the error detection module 108 perform a first error detection operation at a first time to identify errors 114 respectively associated with locations.

A checksum may be generated based on the plurality of locations associated with each of the plurality of errors, at 604. To illustrate, the checksum generator 120 of FIG. 1 may receive error location data 118 and generate the first checksum 124 based on locations associated with the detected errors 114.

A second checksum may be retrieved from a memory array, at 606. To illustrate, the second checksum may be the prior checksum 234 of FIG. 2. The second checksum may correspond to a prior data read operation from the same memory region as the first checksum.

The first checksum and the second checksum may be compared, at 608. For instance, the controller 102 of FIG. 1 may compare the first checksum 124 to the second checksum 126. In another example, the checksum analysis module 228 of FIG. 2 may compare the checksum 226 to the prior checksum 234.

At 610, a determination may be made as to whether a difference between the first checksum and the second checksum is small. For example, the controller 102 of FIG. 1 may determine if a difference between the first checksum 124 and the second checksum 126 is small.

When the determined difference between the first checksum and the second checksum is small, at 610, location information may be evaluated. For example, the controller 102 of FIG. 1 may determine a difference between the first checksum 124 and the second checksum 126 based on a location of an error. As shown in FIG. 3, a location 308 of an error 350 in a first error code operation may be the same as a location 326 of an error 354 in a second error code operation. Alternatively, as shown in FIG. 4, a location 408 of an error 450 in a first error code operation may differ from a location 424 of an error 456 in a second error code operation. Determining whether the difference between the first checksum and the second checksum is small may include comparing the difference to a threshold value. The threshold value may be set based on location-encoding properties of the particular checksum generation type.

The location information may be evaluated to identify a potentially bad wordline, at 612. For instance, it may be determined that a concentration of errors consistently occur near an end of a wordline. Using FIG. 5 to illustrate, locations 506, 508, 512 of errors 550, 552, 554 in a first error code operation may be similar to locations 524, 526, 530 associated with errors 558, 560, 562 in a second error code operation. Errors repeatedly occurring at one end of a wordline may indicate a bad wordline.

A memory region may be identified as having defective storage elements, at 614. For instance, the controller 102 of FIG. 1 may identify a memory region 106 as having a defective cell within a stored data string. As illustrated in FIG. 3, errors repeatedly occurring at a particular memory location may indicate a bad memory cell.

The location(s) within the data may be monitored, at 616. For example, the controller 102 of FIG. 1 may monitor a location corresponding to a detected error 114 for future error occurrences.

A determination may be made as to whether a difference between the first checksum and the second checksum is large, at 618. For example, the controller 102 of FIG. 1 may determine if a difference between the first checksum 124 and the second checksum 126 is large. Determining whether the difference is large may include comparing the difference to a threshold value. The threshold value may be set based on location-encoding properties of the particular checksum generation type.

When the determined difference between the first checksum and the second checksum is large, at 618, location information may be evaluated to determine if an error of the plurality of errors is random, at 620. For instance, the controller 102 of FIG. 1 may determine that detected errors 114 are random based on differences between the first checksum 124 and the second checksum 126.

No action may be initiated in response to the determination that the errors are random, at 622. At 624, the first checksum may be stored. For example, the controller 102 of FIG. 2 may store the first checksum 124 within the log file 122 of the memory array 104.

FIG. 6 thus illustrates a method 600 used to track error data. A first checksum and a second checksum are generated and compared. The checksum is generated based on a location of detected errors within a wordline or other data string. The checksum comparison may determine whether the difference between the checksums is large or small. A small difference may indicate a defective storage element while a large difference may indicate random errors. If detected errors are determined to be random, a determination may be made to take no action.

Figure 7:
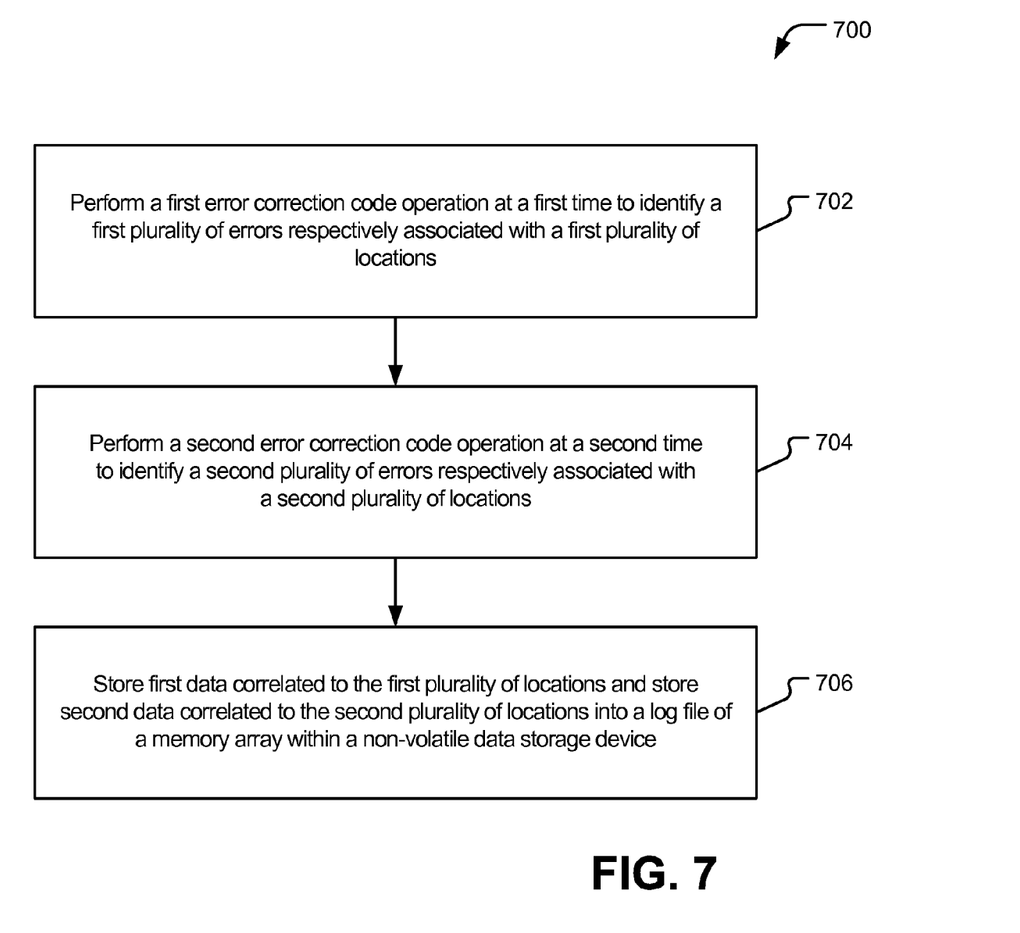
FIG. 7 illustrates a flow chart of a method of tracking and storing error data.

FIG. 7 illustrates a flow chart of a method 700 of tracking and storing error data. The method 700 of FIG. 7 may be performed by a computing system that accesses a memory, such as the controller 102 of FIG. 1 or the controller 202 of FIG. 2. A first error correction code operation may be performed at a first time to identify a first plurality of errors respectively associated with a first plurality of locations, at 702. For example, a location of the first plurality of locations includes a bit position of a page or a block within the non-volatile data storage device. The first error correction code operation may be performed at a controller within a non-volatile data storage device. For example, the controller 202 of FIG. 2 may retrieve data 212 from the memory array 204. The data 212 may be provided to the error detection module 220. Control signals may be generated to cause the error detection module 220 to perform a first error detection operation at a first time to identify errors 214 respectively associated with a first plurality of locations.

A second error correction code operation may be performed at a second time to identify a second plurality of errors respectively associated with a second plurality of locations, at 704. To illustrate, the controller 202 of FIG. 2 may again retrieve data from the memory array 204. The data may be provided to the error detection module 220. Control signals may be generated to cause the error detection module 220 to perform a second error detection operation at a second time to identify errors respectively associated with a second plurality of locations.

First data correlated to the first plurality of locations and second data correlated to the second plurality of locations may be stored into a log file of a memory array within a non-volatile data storage device, at 706. The first data may include a first checksum of the first plurality of locations and the second data may include a second checksum of the second plurality of locations. For example, the controller 202 of FIG. 2 may store checksum history data 218 within the log file 216 of the memory array 204.

FIG. 7 thus illustrates a method 700 that performs a first error correction code operation and a second error correction code operation. Each operation may identify errors associated with locations. Data correlated to the locations may be stored within a memory for use in efficiently identifying errors for correction.

Figure 8:
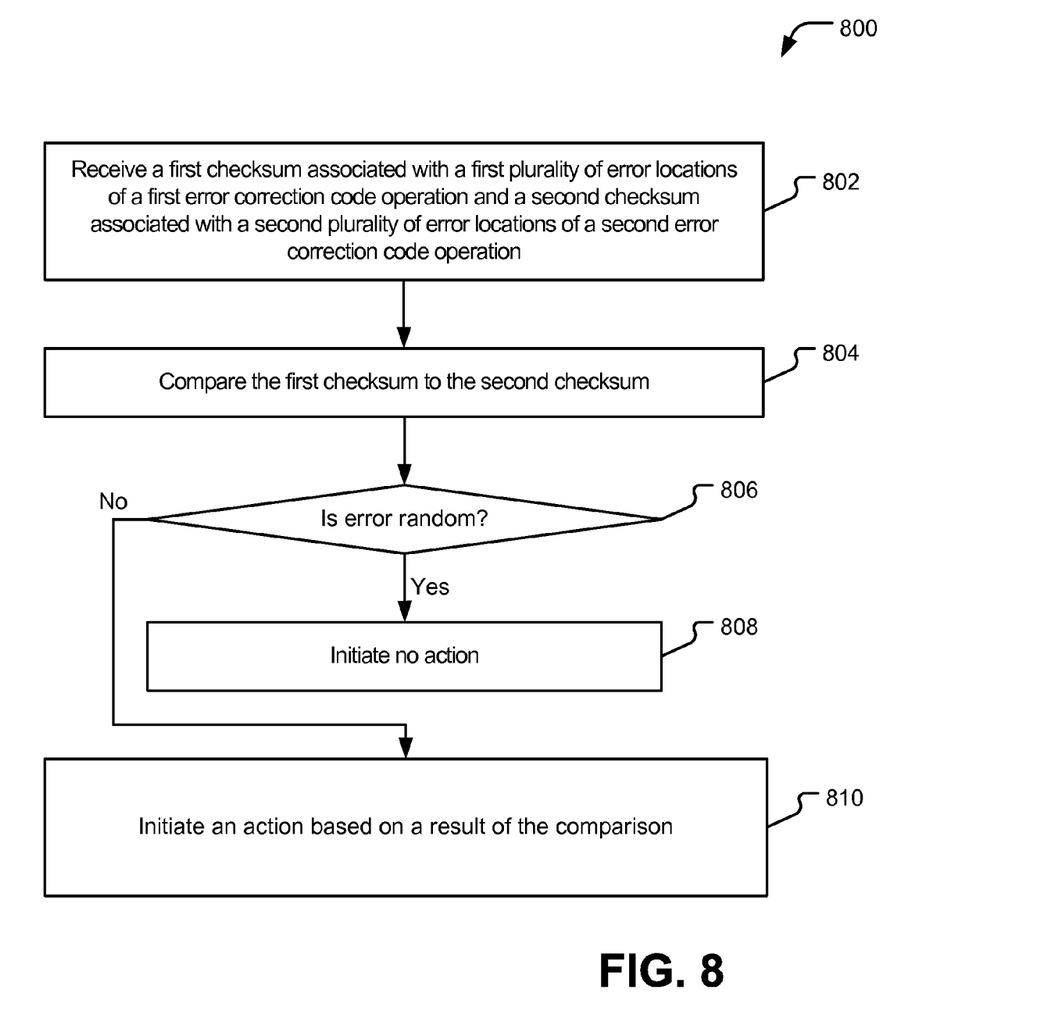
FIG. 8 illustrates a flow chart of a method of tracking and evaluating error data.

FIG. 8 illustrates a flow chart of a method 800 of tracking and evaluating error data. The method 800 of FIG. 8 may be performed by a computing system, such as the controller 102 of FIG. 1 or the controller 202 of FIG. 2. A first checksum associated with a first plurality of error locations of a first error correction code operation may be received, at 802. The first error correction code operation may be associated with correcting an error within a region of a memory array. A second checksum associated with a second plurality of error locations of a second error correction code operation may also be received. For instance, the controller 202 of FIG. 2 may receive the first checksum 226 and the prior checksum 234 from the log file 216 of the memory array 204.

The first checksum may be compared to the second checksum, at 804. For example, the checksum analysis module 228 of FIG. 2 may compare the checksum 226 to the prior checksum 234.

A determination may be made as to whether an error within the region of the memory array is random, at 806. To illustrate, the checksum analysis module 228 of FIG. 2 may evaluate the checksum data 226 to determine if the errors are random.

At 808, no action may be initiated in response to determining that errors are random. An action on a region of a memory array may be initiated based on a result of the comparison, at 810. One of a plurality of available actions based on the comparison of the first checksum to the second checksum may be performed. For example, the action selection module 230 of FIG. 2 may move data 212, initiate a read scrub, refresh data, designate a block of data 212 as being bad, monitor the data 212, or initiate an action to correct an error 214.

FIG. 8 thus illustrates a flowchart of a method 800 that includes receiving checksums associated with error locations of first and second error correction code operations. The checksums may be compared to determine if an error is random. Where an error is not random, a corrective action may be initiated.

Figure 9:
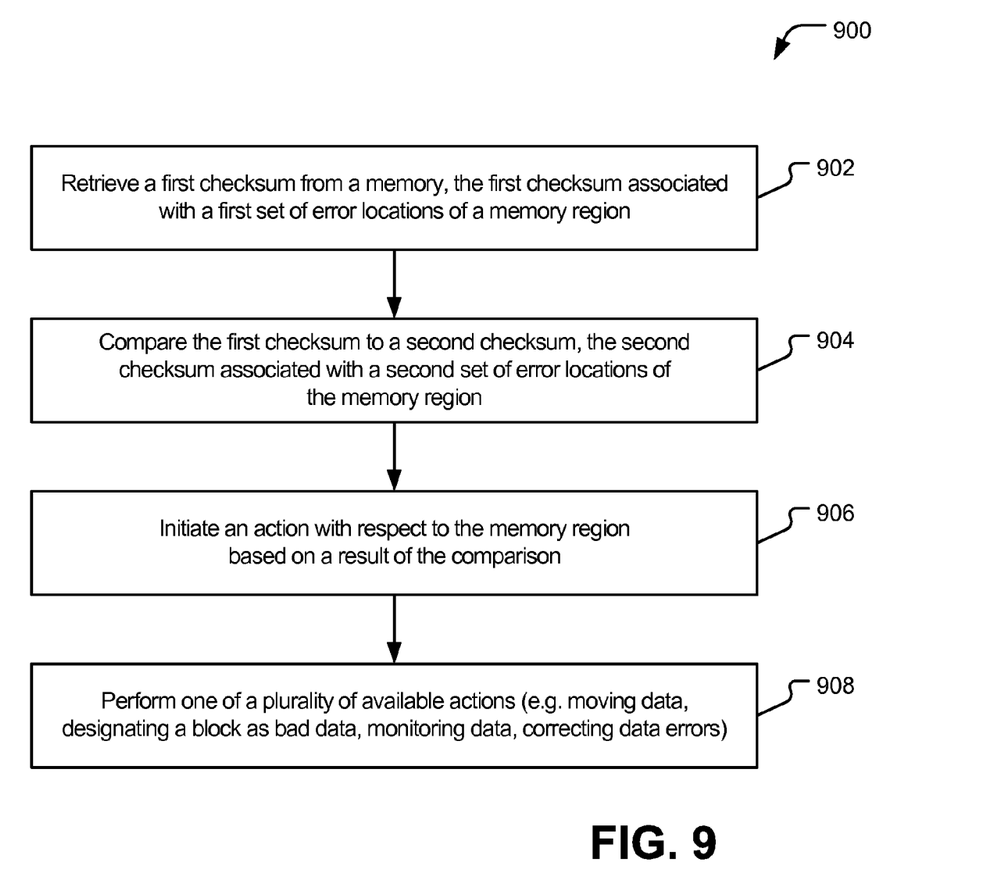
FIG. 9 illustrates a flow chart of a method of identifying and correcting error data.

FIG. 9 illustrates a flow chart of a method 900 of tracking and addressing error data. The method 900 of FIG. 9 may be performed by a computing system, such as the controller 102 of FIG. 1 or the controller 202 of FIG. 2. At 902, a first checksum may be retrieved from memory. The first checksum may be associated with a first set of error locations of a memory region. An error location of the first set of error locations may include a bit position of a page or a block within the non-volatile data storage device. For instance, the controller 102 of FIG. 1 may retrieve the first checksum 124 from the log file 122 of the memory array 114. The first checksum 124 may be associated with errors locations of the memory region 106.

The first checksum may be compared to a second checksum associated with a second set of error locations of the memory region, at 904. For instance, the checksum analysis module 228 of FIG. 2 may compare the checksum 226 to the prior checksum 234.

An action may be initiated with respect to the memory region based on a result of the comparison, at 906. For example, the action selection module 230 of FIG. 2 may initiate an action based on a result of the data. A first action may be initiated when a determined difference between the first checksum and the second checksum is small. To illustrate, a small determined difference may indicate similar error locations. A second action may be initiated when the determined difference between the first checksum and the second checksum is large. In an example, a large determined difference may indicate a large error location difference.

One of a plurality of available actions may be performed, at 908. For instance, the action selection module 230 of FIG. 2 may initiate an action that causes the controller 202 to move the data 212, designate a block of data 212 as being bad, monitor the data 212, perform a read scrub, refresh data, or execute a process to facilitate the correction of an error 214.

FIG. 9 illustrates a flowchart of a method 900 of identifying and correcting errors. Checksums associated with error locations retrieved and compared. An action to correct the errors may be initiated based on a result of the comparison.

Figure 10:
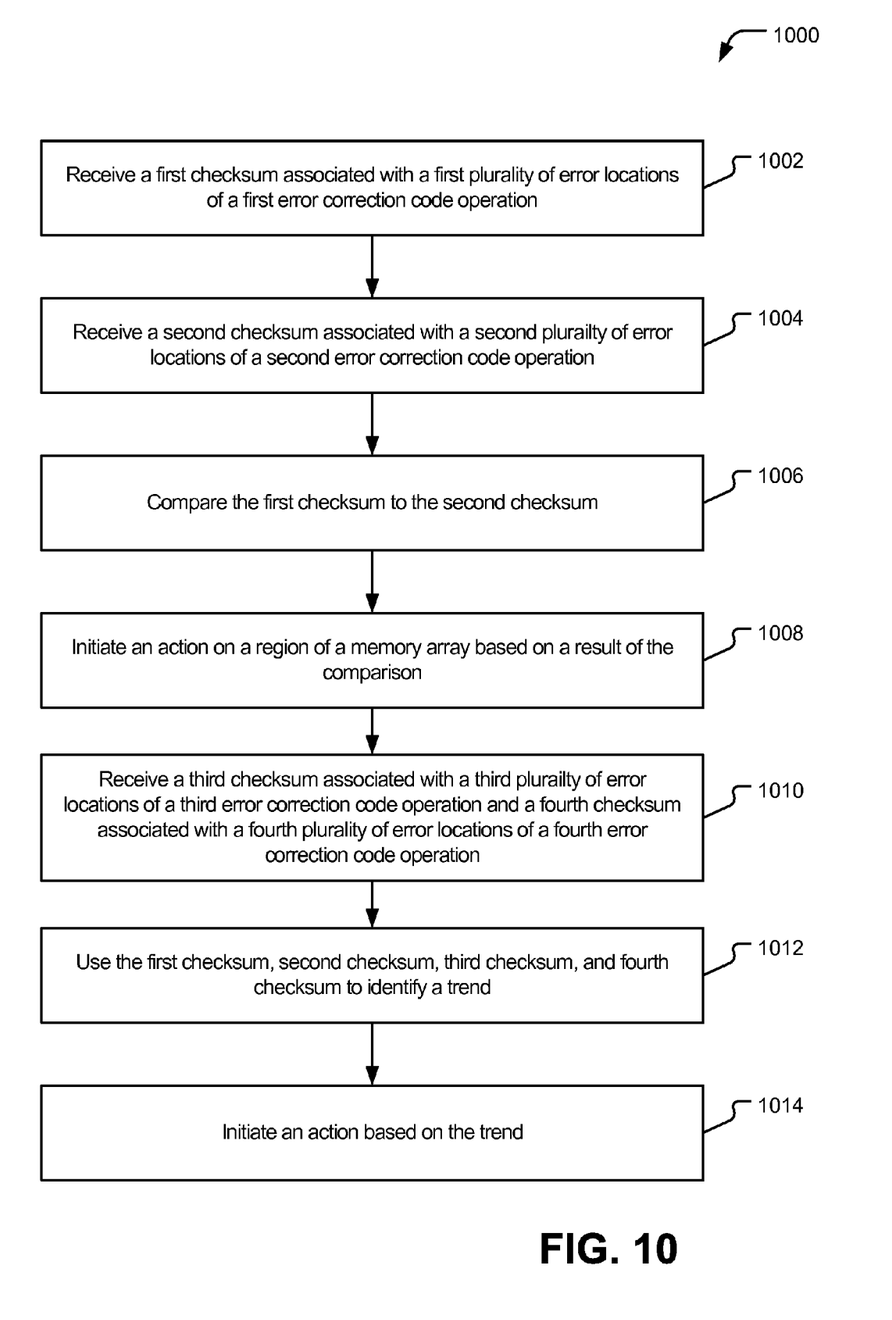
FIG. 10 illustrates a flow chart of a method of identifying a trend indicated by errors generated over multiple error correction code operations.

FIG. 10 illustrates a flow chart of a method 1000 of tracking and addressing error data. The method 1000 of FIG. 10 may be performed by a computing system, such as the controller 102 of FIG. 1 or the controller 202 of FIG. 2. A first checksum associated with a first plurality of error locations of a first error correction code operation may be received, at 1002. For example, the checksum analysis module 228 of FIG. 2 may receive the checksum 226 from the checksum generator 224.

A second checksum associated with a second plurality of error locations of a second error correction code operation may also be received, at 1004. For instance, the controller 202 of FIG. 2 may retrieve the prior checksum 234 from the log file 216 of the memory array 204.

The first checksum may be compared to the second checksum, at 1006. For example, the checksum analysis module 228 of FIG. 2 may compare the checksum 226 to the prior checksum 234.

An action may be initiated with respect to the memory region based on a result of the comparison, at 1008. For example, the action selection module 230 of FIG. 2 may initiate an action based on a result of the data.

A third checksum associated with a third plurality of error locations of a third error correction code operation may be received, at 1010. A fourth checksum associated with a fourth plurality of error locations of a fourth error correction code operation may also be received. For example, the checksum analysis module 228 of FIG. 2 may receive third and fourth checksums from the checksum history 218 of the log file 216 of the memory array 204.

The first checksum, the second checksum, the third checksum, and the fourth checksum may be used to identify a trend, at 1012. To illustrate, the checksum analysis module 228 of FIG. 2 may the checksums retrieved from the checksum history 218 to identify a trend. For example, the checksum analysis module 240 may determine that a number of error consistently occur or are concentrated at the same relative location.

At 1014, an action may be initiated based on the trend. For example, the action selection module 230 of FIG. 2 may move data, initiate a read scrub, designate a block of data as being bad, monitor the data, or initiate an action to correct an error.

FIG. 10 illustrates a flowchart of a method 1000 of identifying a trend indicated by errors generated over a series of error correction code operations. The identified trend may be used to initiate an appropriate corrective action.

Aspects of the disclosed embodiments may increase error identification accuracy by evaluating the locations of errors, rather than just a total number of errors. Processes may thus identify errors that move locations, even when the total number of errors remains constant.

Other aspects of the disclosed embodiments may track errors using data based on ECC corrections that occur with each read operation. Tracked error data may include both error locations and a number of errors. The tracked number of errors may be used to monitor wear out and defects, while the error location data may facilitate disturbance detection.

Other aspects of the disclosed embodiments may generate multiple checksums based on one or more error locations. For example, four checksums may be collected for each page in a memory. The checksums may be determined and included within a tracking log file.

Although various components depicted herein are illustrated as block components and described in general terms, such components may include one or more microprocessors, state machines, or other circuits configured to enable the data error detection module 108 and the checksum generator 120 of FIG. 1 and the error detection module 220, the checksum generator 224, the checksum analysis module 228, and the action selection module 230 of FIG. 2 to perform the particular functions attributed to such components, or any combination thereof. For example, the error detection module 108, the checksum generator 120, or both, of FIG. 1 may represent physical components, such as hardware controllers, state machines, logic circuits, or other structures to enable the data storage device 100 of FIG. 1 to track error data.

The data storage device 100 may be a portable device configured to be selectively coupled to one or more external devices. However, in other embodiments, the data storage device 100 may be attached or embedded within one or more host devices, such as within a housing of a portable communication device. For example, the data storage device 100 may be within a packaged apparatus such as a wireless telephone, a personal digital assistant (PDA), a gaming device or console, a portable navigation device, or other device that uses internal non-volatile memory. In a particular embodiment, the data storage device 100 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of tracking error data, the method comprising:
   receiving data read from a memory;
   performing an error detection operation on the received data to identify a plurality of errors and a plurality of locations, wherein each error of the plurality of errors is associated with a corresponding location of the plurality of locations;
   generating a checksum based on the plurality of locations associated with each of the plurality of errors; and
   storing the checksum in the memory.

2. The method of claim 1, further comprising storing a first checksum based on a first error detection operation performed at a first time and storing a second checksum based on a second error detection operation performed at a second time.

3. The method of claim 2, wherein the first error detection operation is a first error correction code operation and the second error detection operation is a second error correction code operation.

4. The method of claim 2, further comprising comparing the first checksum to the second checksum.

5. The method of claim 4, further comprising comparing one of a plurality of available actions based on the comparison of the first checksum to the second checksum.

6. The method of claim 5, wherein the plurality of available actions includes at least one of moving data, initiating a read scrub, refreshing data, designating a block of data as bad data, monitoring data, and initiating an action to correct an error of the plurality of errors.

7. The method of claim 4, further comprising initiating a first action when a determined difference between the first checksum and the second checksum satisfies a first predetermined threshold and initiating a second action when the determined difference between the first checksum and the second checksum satisfies a second predetermined threshold.

8. The method of claim 4, further comprising evaluating location information represented by at least one of the first checksum and the second checksum when a determined difference between the first checksum and the second checksum satisfies a first predetermined threshold to identify a potentially bad wordline in the memory.

9. The method of claim 8, wherein the potentially bad wordline is identified based on the location information indicating substantially all of the plurality of errors occurring at one end of the potentially bad wordline.

10. The method of claim 4, further comprising, in response to determining that a difference between the first checksum and the second checksum satisfies a second predetermined threshold, determining whether an error of the plurality of errors is random.

11. The method of claim 10, further comprising initiating no action in response to determining that the error is random.

12. The method of claim 1, wherein a location of the plurality of locations comprises a region of the memory.

13. The method of claim 12, wherein the region of the memory comprises a bit position of a page or a block.

14. A method of tracking error data, the method comprising:
   performing a first error correction code operation at a first time to identify a first plurality of errors associated with a first plurality of locations;
   performing a second error correction code operation at a second time to identify a second plurality of errors associated with a second plurality of locations; and
   storing first data correlated to the first plurality of locations and storing second data correlated to the second plurality of locations into a log file of a memory array within a data storage device.

15. The method of claim 14, wherein a location of the first plurality of locations comprises a bit position of a page or a block within the data storage device.

16. The method of claim 14, wherein the first error correction code operation is performed at a controller within the data storage device.

17. The method of claim 14, wherein the first data comprises a first checksum of the first plurality of locations and the second data comprises a second checksum of the second plurality of locations.

18. A method of tracking error data comprising:
- receiving a first checksum associated with a first plurality of error locations of a first error correction code operation;
- receiving a second checksum associated with a second plurality of error locations of a second error correction code operation;
- comparing the first checksum to the second checksum to produce a comparison result; and
- initiating an action on a region of a memory based on the comparison result.

19. The method of claim 18, wherein the first error correction code operation is associated with correcting an error within the region of the memory.

20. The method of claim 18, further comprising performing one of a plurality of available actions based on the comparison result.

21. The method of claim 20, wherein the plurality of available actions includes at least one of: moving data, performing a read scrub, refreshing data, designating a block of data as bad data, monitoring data, and initiating an action to correct an error of the plurality of errors.

22. The method of claim 18, further comprising initiating no action in response to determining that an error within the region of the memory is random.

23. The method of claim 18, further comprising receiving a third checksum associated with a third plurality of error locations of a third error correction code operation and a fourth checksum associated with a fourth plurality of error locations of a fourth error correction code operation and using the first checksum, the second checksum, the third checksum, and the fourth checksum to identify a trend.

24. The method of claim 23, further comprising initiating an action based on the trend.

25. A method of tracking error data, the method comprising:
- retrieving a first checksum from a memory, the first checksum associated with a first set of error locations of a memory region;
- comparing the first checksum to a second checksum to produce a comparison result, the second checksum associated with a second set of error locations of the memory region; and
- initiating an action with respect to the memory region based on the comparison result.

26. The method of claim 25, wherein the action includes at least one of: moving data, designating a block of data as bad data, performing a read scrub, refreshing data, monitoring data, and correcting an error of the plurality of errors.

27. The method of claim 25, further comprising initiating a first action when a determined difference between the first checksum and the second checksum satisfies a first predetermined threshold and initiating a second action when the determined difference between the first checksum and the second checksum satisfies a second predetermined threshold.

28. The method of claim 25, wherein an error location of the first set of error locations comprises a bit position of a page or a block within the memory region of a data storage device.

29. An apparatus, comprising:
- a memory;
- an error detection module coupled to the memory, wherein a plurality of locations and a plurality of errors are detected by the error detection module in response to data read from the memory; and
- a processor configured to compare a checksum based on a plurality of locations associated with each of a plurality of errors to a prior checksum to produce a comparison result, wherein the processor is further configured to initiate at least one of a plurality of available actions based on the comparison result.

30. The apparatus of claim 29, wherein the processor is further configured to initiate storage of the checksum in the memory.

31. The apparatus of claim 29, wherein the error detection module includes an error correcting code (ECC) engine at a controller coupled to the memory, wherein the controller and the memory are components of a removable data storage device.

32. The apparatus of claim 31, wherein the controller includes the processor coupled to the ECC engine.

33. The apparatus of claim 31, wherein the checksum is generated by at least one of the ECC engine, a Multiple Input Signature Register, an accumulating adder, and a polynomial based circuit.

34. An apparatus, comprising:
- a memory including a memory region of a memory; and
- a controller configured to access the memory and to retrieve a first checksum associated with a first plurality of error locations of a first error correction code operation on first data read from at least one of the plurality of memory regions and a second checksum associated with a second plurality of error locations of a second error correction code operation on second data read from the at least one of the plurality of memory regions, to compare the first checksum to the second checksum, to produce a comparison result, and to initiate an action associated with the at least one of the plurality of memory regions at least partially based on the comparison result.

35. The apparatus of claim 34, wherein the memory comprises a non-volatile memory.

36. The apparatus of claim 34, wherein the memory comprises a flash memory.

37. The apparatus of claim 34, wherein the controller is further configured to store the first checksum and the second checksum within the memory.

* * * * *

UNITED STATES PATENT AND TRADEMARK OFFICE
CERTIFICATE OF CORRECTION

PATENT NO. : 8,255,773 B2
APPLICATION NO. : 12/494186
DATED : August 28, 2012
INVENTOR(S) : Manuel Antonio d'Abreu et al.

It is certified that error appears in the above-identified patent and that said Letters Patent is hereby corrected as shown below:

In the Claims

Column 12, Claim 14, Lines 59-60, "and storing second data correlated to the second plurality of locations into a log file of a memory array within" should read --and storing second data correlated to the second plurality of locations into a log file of a memory within--.

Column 14, Claim 33, Lines 31-32, "generated by at least one of the ECC engine, a Multiple Input Signature Register, an accumulating adder, and a polynomial" should read --generated by at least one of the ECC engine, a multiple input signature register, an accumulating adder, and a polynomial--.

Signed and Sealed this
Twenty-second Day of July, 2014

Michelle K. Lee
*Deputy Director of the United States Patent and Trademark Office*